United States Patent [19]
Ross et al.

[11] Patent Number: 5,895,033
[45] Date of Patent: Apr. 20, 1999

[54] PASSIVE BALANCE SYSTEM FOR MACHINES

[75] Inventors: Brad Ross, West Richland; Ronald W. Olan, Kennewick, both of Wash.

[73] Assignee: Stirling Technology Company, Kennewick, Wash.

[21] Appl. No.: 08/748,365

[22] Filed: Nov. 13, 1996

[51] Int. Cl.$^6$ .................... F16F 1/34; F25B 9/00
[52] U.S. Cl. .................... 267/161; 60/520; 62/6
[58] Field of Search .................... 188/378, 379, 188/380; 267/160, 161, 162, 166, 166.1, 174, 136; 60/517, 520; 62/6

[56] References Cited

U.S. PATENT DOCUMENTS

| | | | |
|---|---|---|---|
| 3,240,073 | 3/1966 | Pitzer | 73/517 |
| 3,462,136 | 8/1969 | Rumsey | 267/160 |
| 4,140,868 | 2/1979 | Tuttle | 174/42 |
| 4,397,155 | 8/1983 | Davey | 62/6 |
| 4,400,941 | 8/1983 | Rauch | 60/520 |
| 4,475,335 | 10/1984 | Davey | 60/520 |
| 4,610,143 | 9/1986 | Stolfi et al. | 62/6 |
| 4,619,349 | 10/1986 | Braun | 188/380 |
| 4,694,650 | 9/1987 | Vincent | 60/520 |
| 4,798,054 | 1/1989 | Higham | 62/6 |
| 4,819,439 | 4/1989 | Higham | 62/6 |
| 4,862,695 | 9/1989 | Kushnir | 62/6 |
| 5,255,521 | 10/1993 | Watanabe | 62/6 |
| 5,351,490 | 10/1994 | Ohishi et al. | 267/161 X |
| 5,487,375 | 1/1996 | McDonald, Jr. | 267/136 X |
| 5,522,214 | 6/1996 | Beckett et al. | 60/517 |
| 5,615,664 | 4/1997 | McDonald, Jr. | 188/378 X |
| 5,642,618 | 7/1997 | Penswick | 60/520 |
| 5,647,217 | 7/1997 | Penswick et al. | 62/6 |
| 5,743,091 | 4/1998 | Penswick et al. | 60/517 |

FOREIGN PATENT DOCUMENTS

| | | |
|---|---|---|
| 0 553 818 A1 | 4/1993 | European Pat. Off. . |
| WO 90/12961 | 1/1990 | WIPO . |

*Primary Examiner*—Peter M. Poon
*Attorney, Agent, or Firm*—Wells, St. John, Roberts, Gregory & Matkin, P.S.

[57] ABSTRACT

A passive balance system for counterbalancing vibrations of a machine is taught. The passive balance system includes a support member adapted to be fixedly carried by the machine and a flexure assembly carried by the support member. The flexure assembly is in the form of at least one flat spring including connections along a central portion. The central portion is fixedly mounted to the support member, and an outer peripheral portion of the flat spring provides at least in part a movable counterbalance mass. The flexure assembly presents the counterbalance mass for movement in substantial alignment with a desired rectilinear component of vibration of the machine to counterbalance vibrations emanating therefrom. A vibration balanced machine having the passive balance system is also disclosed.

24 Claims, 7 Drawing Sheets

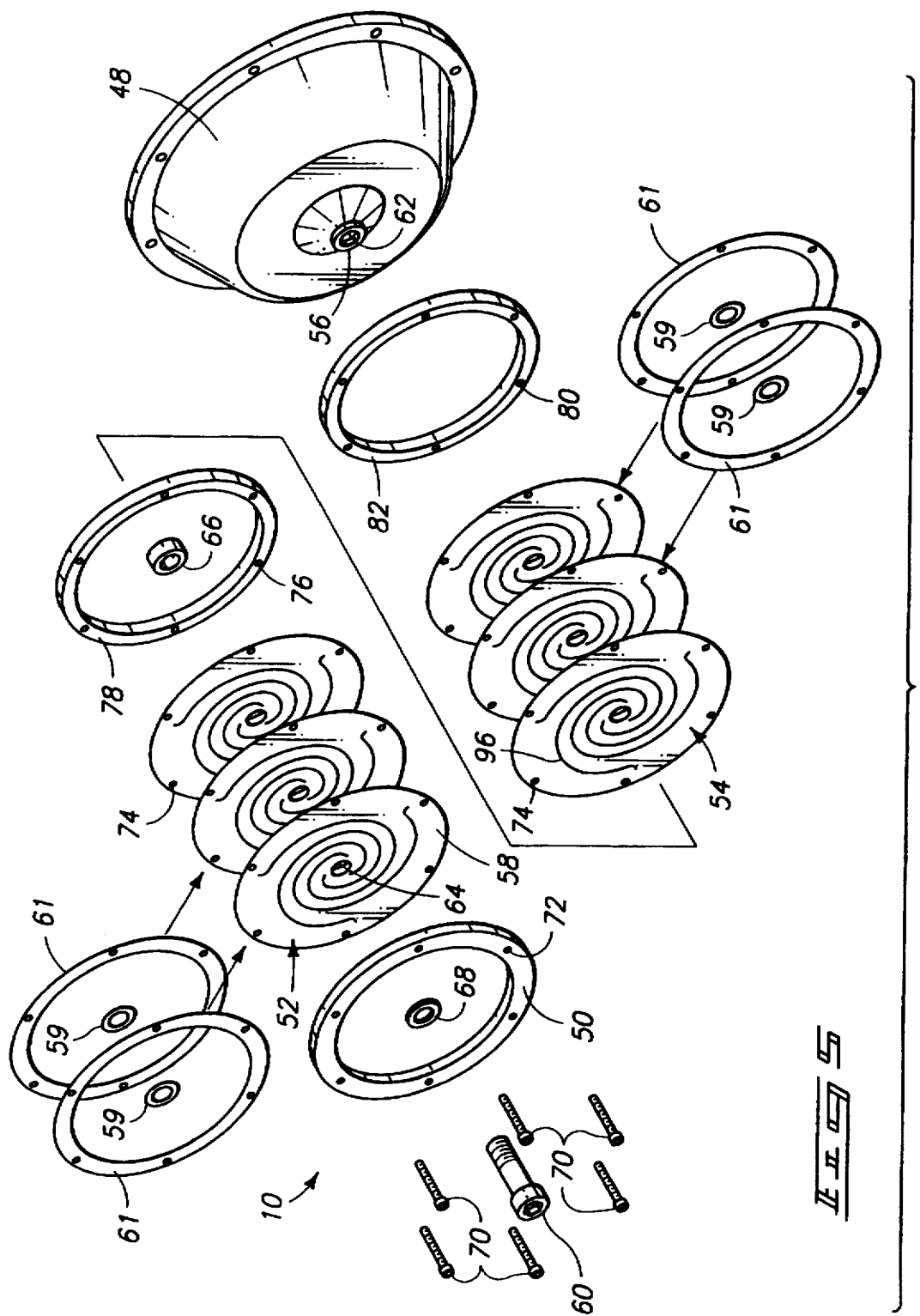

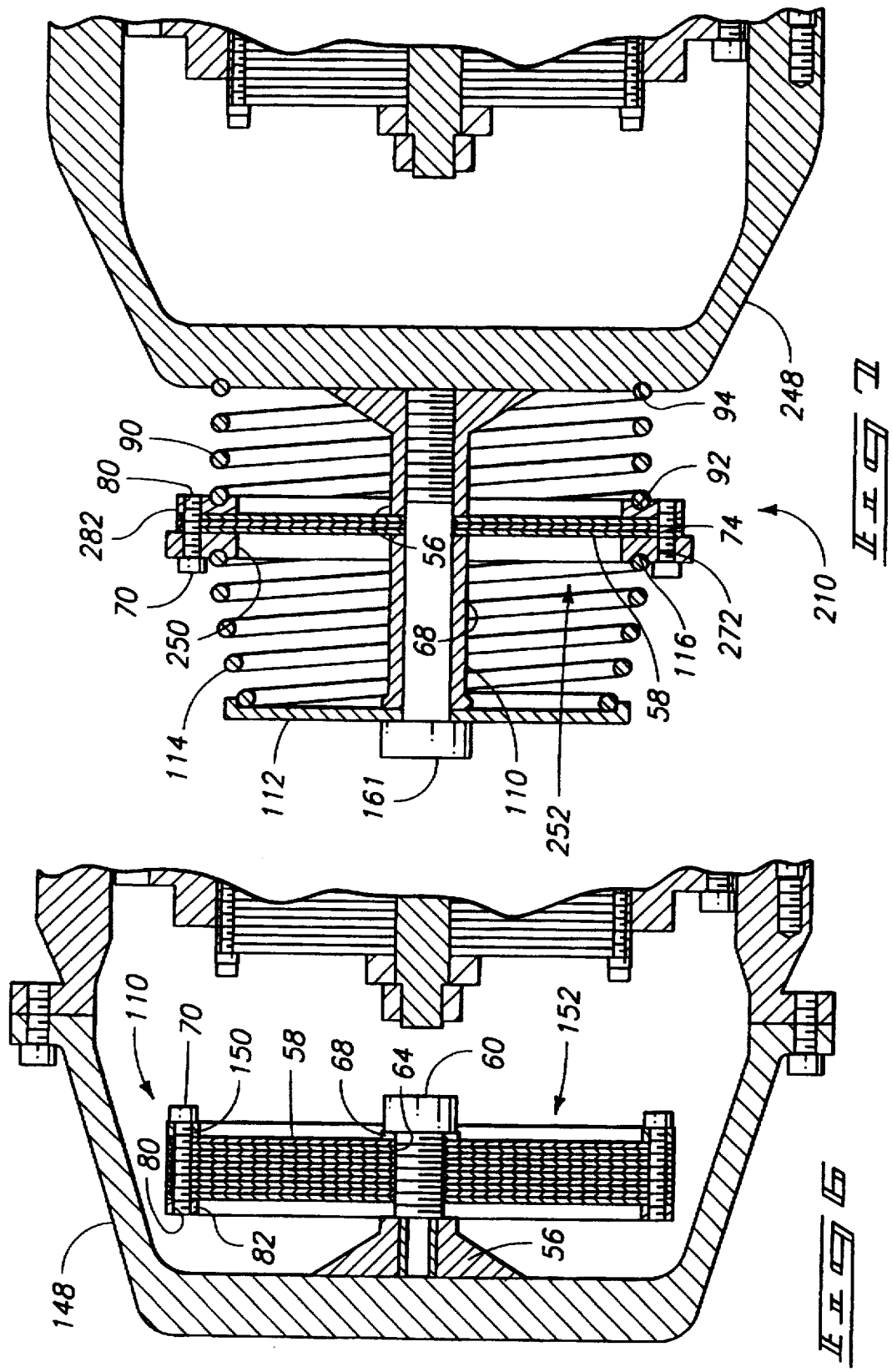

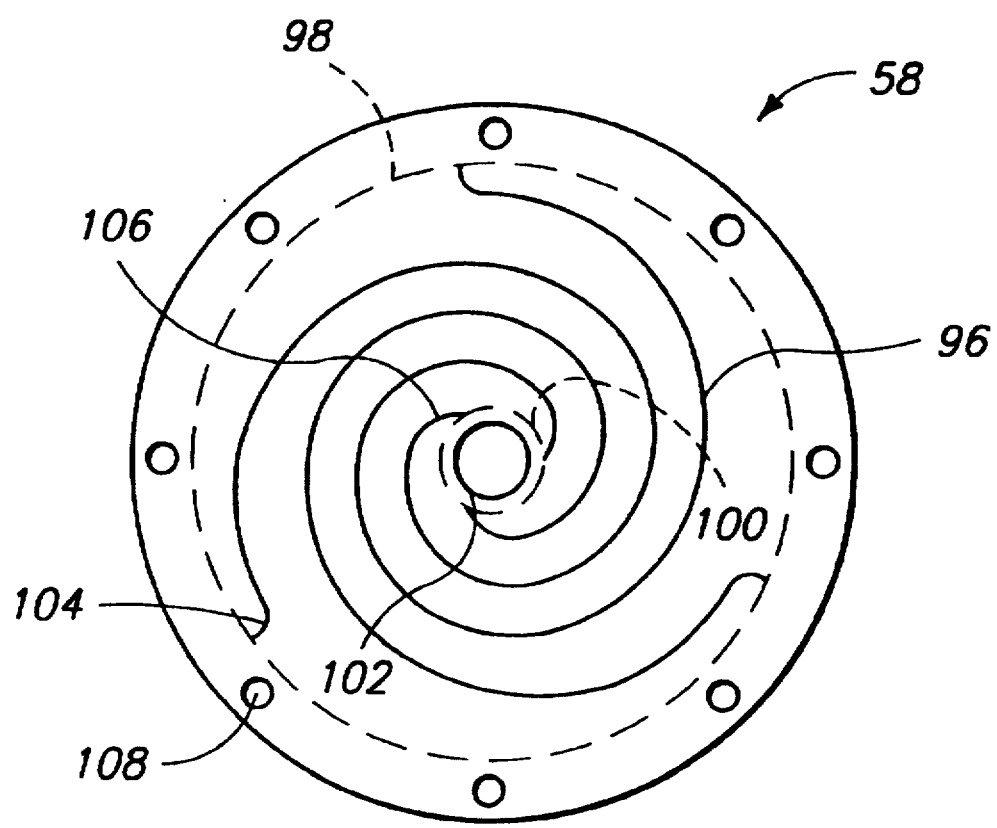

PASSIVE BALANCE SYSTEM FOR MACHINES

TECHNICAL FIELD

This invention relates to vibration balancing of machinery, and more particularly to a passive vibration balancer for a vibrating machine.

BACKGROUND OF THE INVENTION

Over the years, the study of machine dynamics has lead to the development of vibration-damping systems for reducing undesirable vibration modes produced when operating a machine. In order for machines to transform (or transfer) energy, they typically have a number of fixed and moving bodies interposed between a source of power and an area where work is to be done. The bodies serve to adapt one to the other. Electric motors transform electrical energy into mechanical energy. Gasoline engines have connecting rods and crankshafts that act as a machine to transfer combustion energy into drive train energy. Stirling engines convert heat into reciprocating piston motion within a thermodynamic gas environment, the piston working on the thermodynamic gas to create mechanical power. Each of these devices when operating produces vibration. Stirling cryogenic coolers convert electrical energy into reciprocating piston motion that operates on a thermodynamic gas via a reciprocating displacer to produce a cool region.

With nearly all types of machines, vibration is caused by operation of the machine. For many machines, the vibration involves some form of reciprocating motion within the machine. It is frequently desirable to eliminate one or more components of the vibration that are created during operation of a machine. Many devices have been created for reducing, or eliminating, machine vibration. For example, counterweights are used on a crankshaft of an internal combustion engine. However, many of these balance systems are complex and cumbersome. Some even require their own drive motor (active system).

One exemplary area where simple and lightweight balance systems are in need of significant improvements is the field of linear motion machines. One exemplary linear motion machine is a free piston Stirling machine, such as a free piston Stirling cycle engine. A typical free piston Stirling engine contains a single displacer and a single power piston that cooperate in fluid communication via a thermodynamic working gas. Such an engine construction can be resolved into a machine vibration problem that principally has a two-dimensional vibration component. Such machines have the simplest of controls, but are inherently unbalanced. The reciprocating masses cooperate through the working gas, transmitting alternating forces while within a sealed vessel. Typically, operation of such a Stirling machine can produce large unbalanced dynamic vibration forces that require use of a large mounting structure to absorb forces produced during operation. Alternatively, sophisticated suspension arrangements are required to isolate the machine from its mounting structure. However, these systems frequently prove too complex and heavy where it is necessary that the system be portable and lightweight. For example, use of these devices for space exploration and remote site usage requires that the devices be constructed to have a minimized total weight.

Therefore, there is a need to provide an improved balance system for use with vibrating machines which provides a needed counterbalance mass with a device having a reduced overall mass. Furthermore, there is a need to provide such a counterbalance mass in a manner which can be easily tuned to accommodate specific operating frequencies of the linear motion machine.

The present invention arose from an effort to develop a passive balance system that is relatively low in cost, is relatively light in weight for a particularly sized counterbalance mass, has vibration characteristics that can be easily tuned to a particular machine operating speed by changing the counterbalance mass and/or the spring constant, and can be easily mounted onto an existing machine along a desired line of vibration to be counterbalanced in one of several manners.

BRIEF DESCRIPTION OF THE DRAWINGS

Preferred embodiments of the invention are described below with reference to the following accompanying drawings.

FIG. 5 is an enlarged exploded perspective view of the passive balance system of FIG. 1;

FIG. 6 is an enlarged centerline cross-sectional view of an alternatively constructed passive balance system for use on the linear motion machine of FIGS. 1–5;

FIG. 7 is an enlarged centerline cross-sectional view of another alternatively constructed passive balance system for use on the linear motion machine of FIGS. 1–5; and FIG. 8 is a plan view illustrating one suitably constructed flexural spring for use in the devices of FIGS. 1–7.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of this invention, a passive balance system for counterbalancing vibrations of a machine is taught. The passive balance system includes a support member adapted to be fixedly carried by the machine and a flexure assembly carried by the support member. The flexure assembly is in the form of at least one flat spring including connections along a central portion. The central portion is fixedly mounted to the support member, and an outer peripheral portion of the flat spring provides at least in part a movable counterbalance mass. The flexure assembly presents the counterbalance mass for movement in substantial alignment with a desired rectilinear component of vibration of the machine to counterbalance vibrations emanating therefrom.

In accordance with another aspect of this invention, a vibration counterbalanced machine having a housing member, a support member, and a flexure assembly is taught. The housing member supports a working member in substantially periodic and oscillating relation within the machine. The support member is fixedly carried by the housing member of the machine. The flexure assembly, provided in the form of at least one flat spring, is fixedly mounted to the support member. The spring includes connections along a central portion, the central portion being fixedly mounted to the support member. An outer peripheral portion of the flat spring provides at least in part a counterbalance mass for the machine. In assembly, the flexure assembly presents the counterbalance mass for movement in substantial alignment with a desired rectilinear component of vibration of the machine to counterbalance vibrations emanating therefrom.

Figure 1:
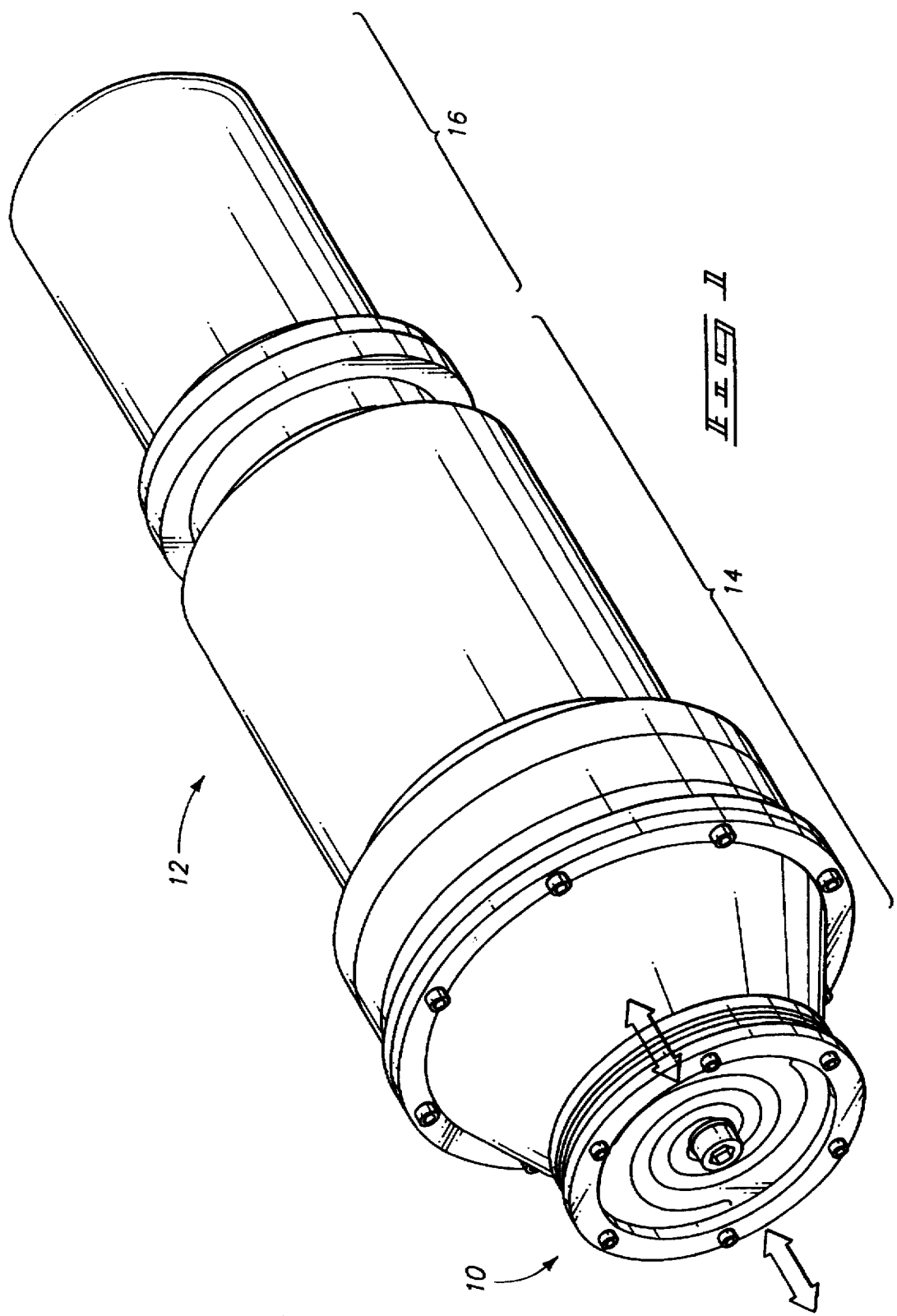
FIG. 1 is a perspective view of a Stirling power generator with a passive balance system embodying this invention.
Figure 2:
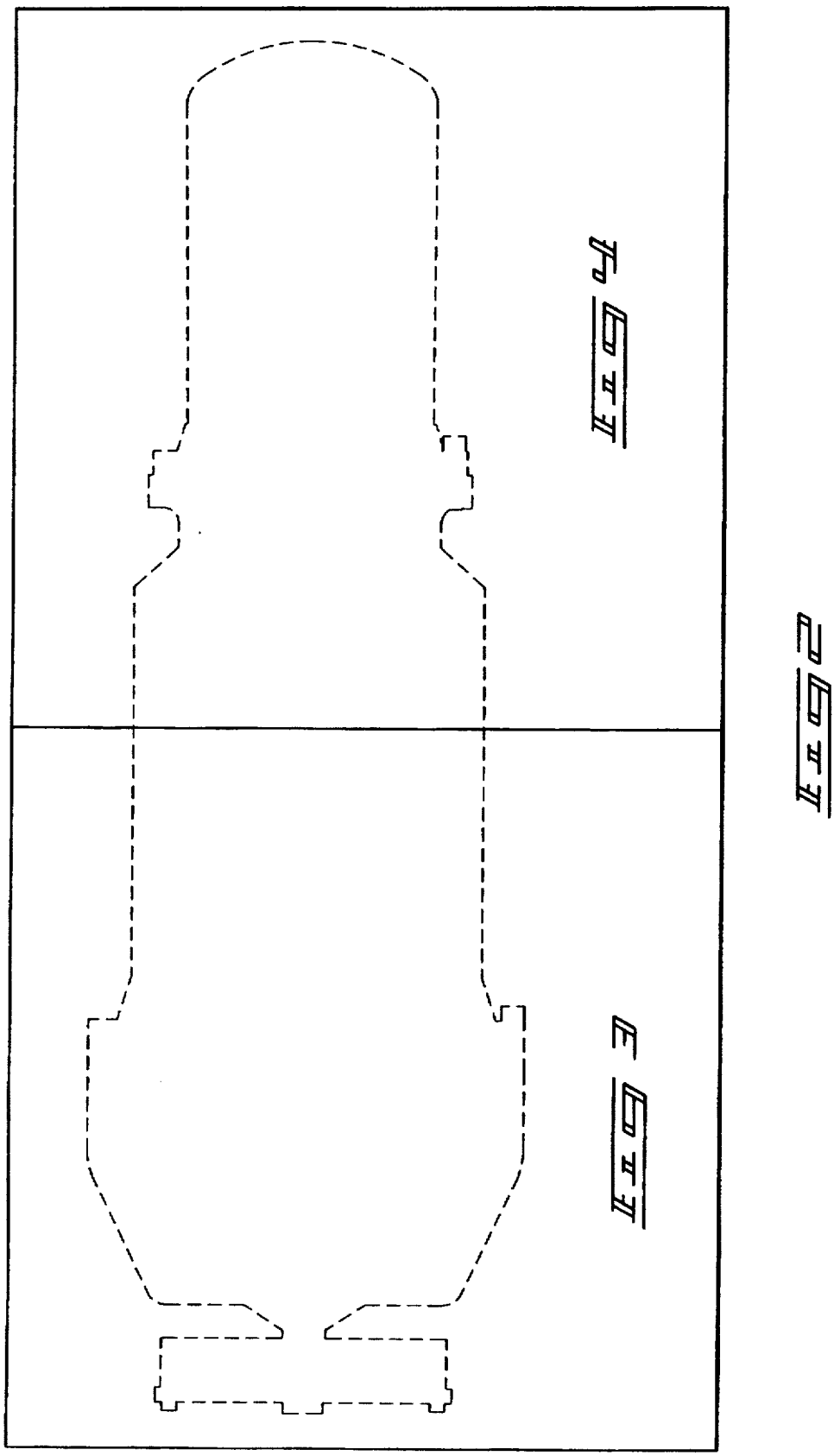
FIG. 2 is a layout illustrating the assembly of FIGS. 3 and 4.

A preferred embodiment of a machine balance device configured as a passive balance system is generally designated with reference numeral "10" in FIG. 1. Balance system 10 is shown on a Stirling power generator. The Stirling power generator has an engine module assembly and a power module assembly and is generally designated with reference numeral "12" in FIG. 1. According to FIGS. 3 and 4, power generator 12 is formed by joining together a power module 14 and an engine module 16 with a plurality of circumferentially spaced apart threaded fasteners 18. The inside of power generator 12 is filled with a charge of pressurized thermodynamic working gas such as helium. Alternatively, hydrogen or any of a number of suitable thermodynamically optimal working fluids can be used to fill and charge the inside of generator 12.

Figure 3:
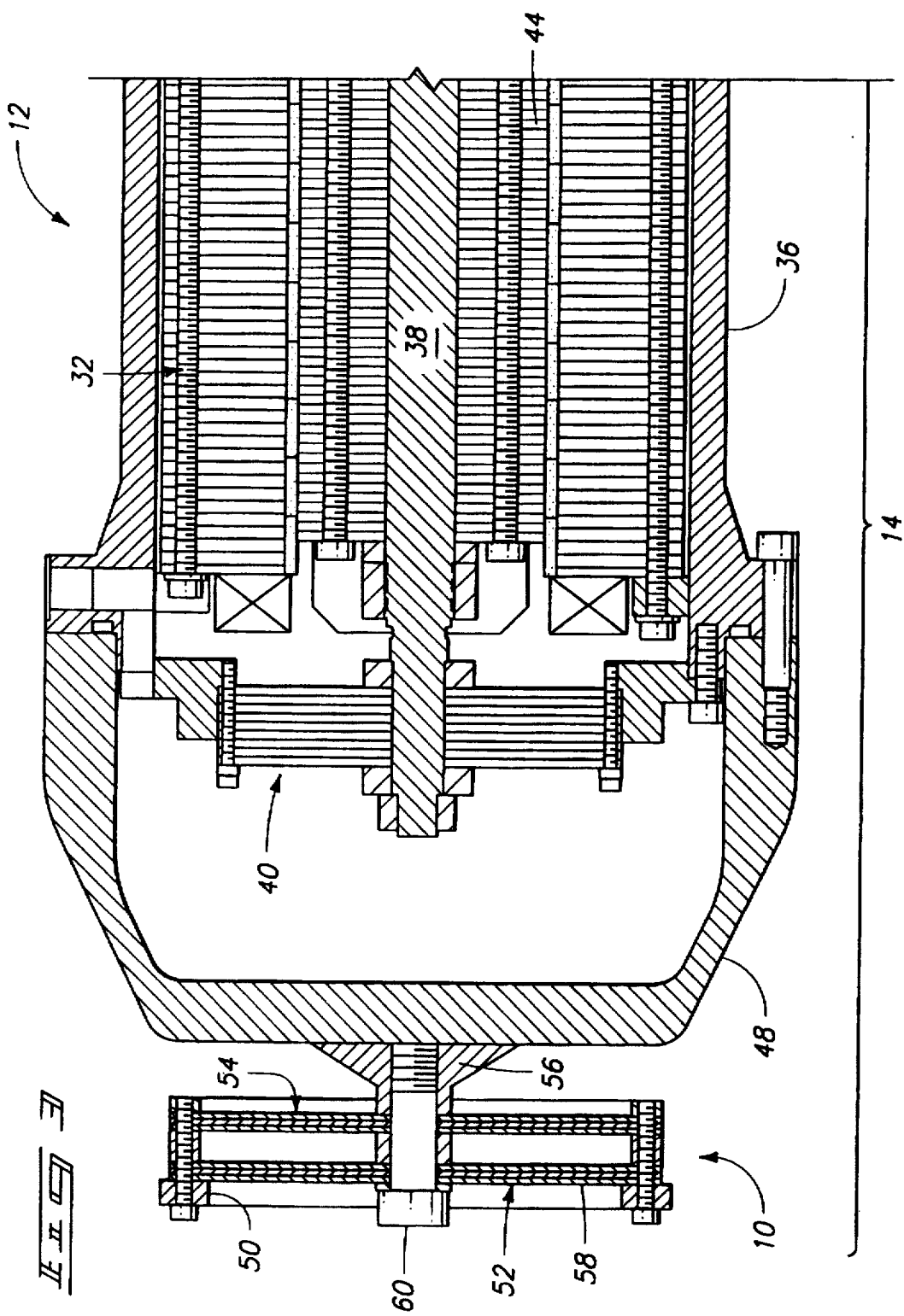
FIG. 3 is a first portion of FIG. 2 illustrating a centerline cross-sectional view of an exemplary linear motion machine having a passive balance system embodying this invention.
Figure 4:
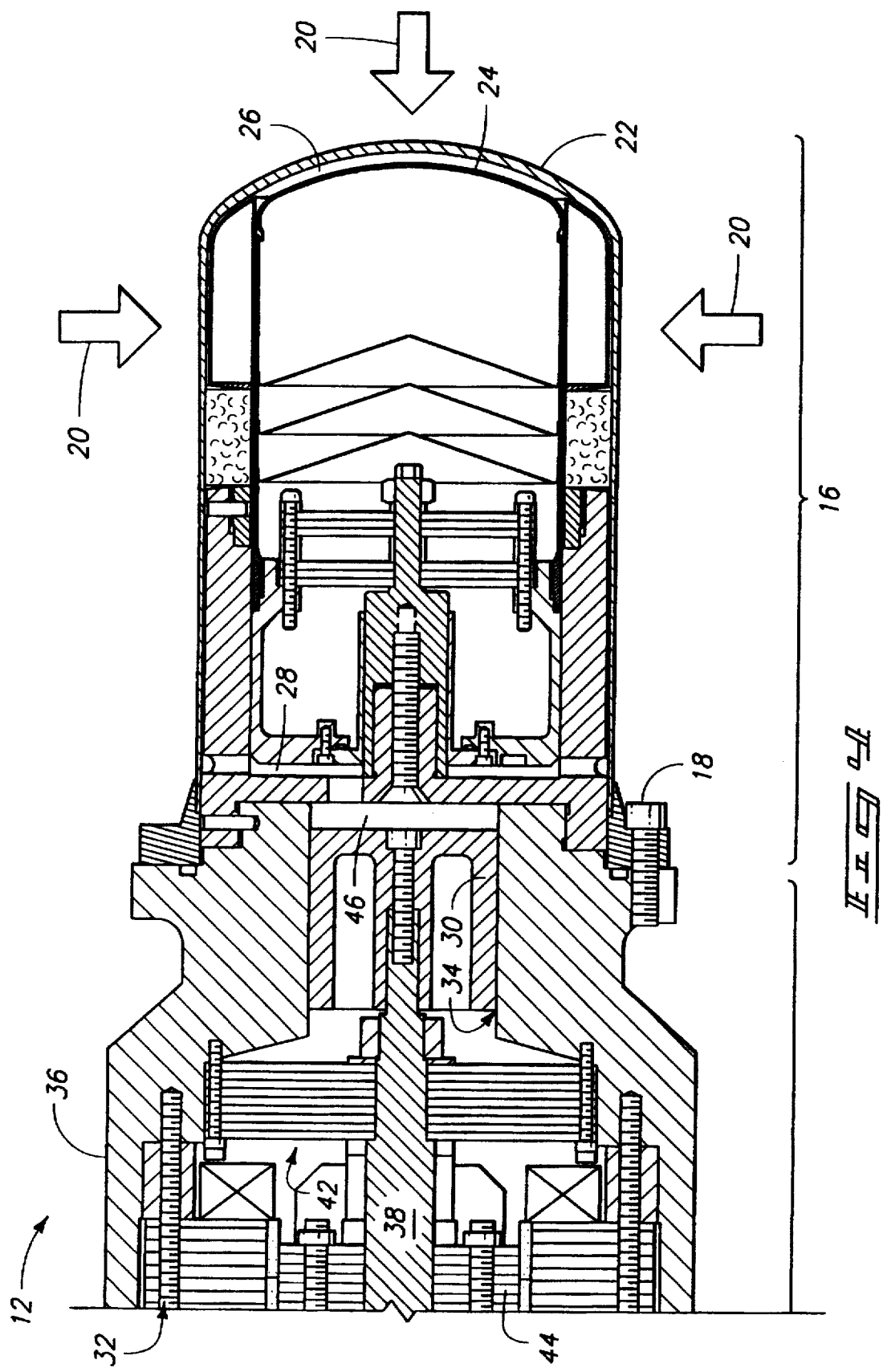
FIG. 4 is a second portion of FIG. 2 illustrating a centerline cross-sectional view of an exemplary linear motion machine having a passive balance system embodying this invention.

A heat source 20 applies heat to a heater head 22 of engine module 16, causing power module 14 to generate a supply of electric power, as shown in FIGS. 3 and 4. A displacer 24, comprising a movable displacer piston that is assembled together with several separate components, reciprocates between a hot space 26 and a cold space 28 in response to thermodynamic heating of the hot space from heater head 22 via heat source 20. In operation, displacer 24 moves working gas between the hot and cold spaces 26 and 28. A power piston 30, suspended to freely reciprocate within power module 14 and in direct fluid communication with cold space 28, moves in response to cyclic pressure variations within the cold space caused by reciprocation of displacer 24. Details of such a Stirling power generator are similar to those disclosed in our U.S. patent application Ser. No. 08/637,923 filed on May 1, 1996, and entitled "Heater Head and Regenerator Assemblies for Thermal Regenerative Machines", listing inventors as Laurence B. Penswick and Raymond M. Erbeznik. This Ser. No. 08/637,923 application, which is now U.S. Pat. No. 5,743,091 is hereby incorporated by reference.

Power generator 12 produces electrical power when heat source 20 applies heat to heater head 22 as shown in FIGS. 3 and 4. Displacer 24 reciprocates when heat is applied to head 22 as working gas adjacent to displacer 24 expands as it is heated and contracts as it cools. A linear alternator 32, provided in fluid communication with displacer 24 via a power piston 30, is driven by fluid pressure variations created by reciprocation of displacer 24. Reciprocating motion of power piston 30 within a receiving bore 34 of a power module housing 36 causes linear alternator 32 to produce electrical power. Power piston 30 is rigidly carried on an end of an alternator shaft 38. A pair of flexure bearing assemblies 40 and 42 support piston 30 and shaft 38 in accurate, axially movable relation relative to bore 34, forming a clearance seal between bore 34 and power piston 30. Shaft 38 also carries inner moving laminations 44 of linear alternator 32. Power piston 30, alternator shaft 38, moving laminations 44, and flexure assemblies 40 and 42 all move as pressure fluctuations occur within working chamber 46, in response to fluid pressure fluctuations created in the working fluid from movement of displacer 24. As a result, an accurate axially reciprocating motion occurs two-dimensionally along the common axis of displacer 24 and alternator shaft 38. However, such motion also produces a two-dimensional unbalanced vibration.

To compensate for the unbalanced vibration that results from such reciprocating motion, passive balance system 10 is mounted to an exterior housing member 48 of generator 12 according to the construction depicted in FIGS. 3–5. Balance system 10 has a cylindrical counterbalance mass 50 movably carried on a pair of flexure assemblies 52 and 54 via a rigid mounting post 56 of housing member 48. Mass 50 (and associated moving system components) moves with accurate axial reciprocation along an axis that is perpendicular to a circular plan view profile of cylindrical mass 50 and flexure assemblies 52 and 54. Preferably, balance system 10 is mounted to housing member 48 so that the travel axis of moving mass 50 is parallel to a desired two-dimensional unbalanced vibration of machine 12. Alternatively, the travel axis of moving mass 50 is aligned in parallel relation with a recognized component of vibration that one desires to counterbalance on a vibrating machine.

According to one alternative configuration, a balance system 10 of this invention can be mounted so that the balance mass is collinear with one uniaxially moving member of the machine, while other moving members lie along other axes. Hence, the vibrations caused by the collinear moving member can be selectively balanced. For example, for the case where the linear reciprocating machine is a cryogenic cooler, a linear motor is substituted for power generator 12 and a cryogenic cooler head is substituted for engine module 16. Typically, with this construction, the cryogenic cooler portion is configured with an axis of motion that is oriented ninety degrees (90°) in relation to the axis of reciprocation for the linear drive motor. In such case, a passive balance system can be mounted onto each end of the device, one being collinear with the axis of motion of each reciprocating member, counterbalancing vibration imparted by the displacer and the linear reciprocating motor, respectively. In this configuration, displacer 24 is configured to reciprocate along an axis that is not collinear with the axis of alternator shaft 38.

Alternatively, a component of vibration originating from a machine having complex vibration modes can be selectively removed with balance system 10. Preferably, such an application will involve one predominant uniaxial vibration which one desires to counterbalance. Further alternatively, it is not necessary that balance system 10 be mounted collinear with the uniaxial vibration. Instead, system 10 can be mounted parallel to a reciprocating member, but offset from the axis of reciprocation. Such a configuration will still offset a substantial portion of vibration produced by the reciprocating member. However, torsional vibration components will remain.

Further details of the construction and operation of power generator 12 (excluding balance system 10) that results in linear reciprocating unbalanced forces are detailed in Applicants' previously mentioned U.S. Pat. No. 5,743,091 and are not repeated here as they only relate peripherally to the claimed inventive subject matter.

It is further understood that any of a number of machines that produce unbalanced forces during operation, along one or more axes, can be counterbalanced by using one or more of the passive balance systems 10 of this invention. Examples of such machines include any of a number of internal combustion engines having moving pistons, or any of a number of closed-cycle thermodynamic machines having internal moving pistons and/or displacers. Each of these machines produces reciprocating unbalanced dynamic forces suitable for counterbalance with the devices of this invention. In fact, any machine producing one or more unbalanced forces having a uni-directional component could conceivably be used with the passive balance system of this invention. Even further, it is intended that the balance system 10 of this invention can be used with any machine producing vibration. However, its full benefits are best realized when used on a machine producing unbalanced vibrations predominantly along a single axis. Hence, Stirling cycle thermal regenerative machines are suitable candidates for receiving the full benefits of this invention.

Flexure assemblies 52 and 54 are each formed from a plurality of flat spiral springs 58, each formed from a flat metal sheet having kerfs forming axially movable arms across them. The flat spring includes radially spaced connections for connecting in assembly to first and second members, respectively, for accommodating relative axial movement between the first and second members while maintaining the first and second members in coaxial alignment. Preferably, the first member comprises the counterbalance mass 50 and/or associated mounting hardware, and the radial spaced connections comprise a circumferential outer periphery configured with a plurality of spaced apart mounting apertures, the apertures each constructed and arranged to receive a fastener for mating in assembly with the counterbalance mass and/or mounting hardware. Preferably, the second member comprises a fastener 60 and/or associated mounting hardware, and the radial spaced connections comprise a circumferential inner periphery configured with at least one mounting aperture, the aperture constructed and arranged to mate in assembly with the fastener and/or mounting hardware. Preferably, the spring comprises a flat spiral spring, and the kerfs comprise spiral kerfs.

When assembled into flexure assemblies 52 and 54, mass 50 is supported for accurate axial reciprocation relative to post 56 and housing member 48 as seen in FIGS. 3–5. The inside diameter of springs 58 is fixedly mounted to the object that is the source of vibration needing absorption, via post 56. Details of such a flat spiral spring construction are similar to those disclosed in Applicants' U.S. Pat. No. 5,522,214 filed on Jul. 30, 1993, and issued on Jun. 4, 1996, and entitled "Flexure Bearing Support, With Particular Application to Stirling Machines", listing inventors as Carl D. Beckett, Victor C. Lauhala, Ron Neely, Laurence B. Penswick, Darren C. Ritter, Richard L. Nelson, and Burnell P. Wimer. This '214 patent is hereby incorporated by reference. Because such springs 58 are very stiff in the radial direction, springs 58 also act as a linear bearing, guiding mass 50 in accurate axial reciprocation and preventing mass 50 from oscillating in other directions. Further details of one exemplary spring 58 are disclosed with reference to FIG. 8 below.

Preferably, springs 58 have spiral kerfs 96 that extend clockwise or counter clockwise as shown in FIG. 5. Preferably, one of flexure assemblies 52 and 54 is assembled with springs 58 arranged with a clockwise orientation, and the other of assemblies 52 and 54 is arranged with a counterclockwise orientation. In this manner, any tendency for springs 58 to cause relative rotation between the inner and the outer peripheries of the spring as the inner and outer peripheries are relatively displaced (perpendicular to the plane of the spring) is reduced, or eliminated. Optionally, adjacent springs within each of assemblies 52 and 54 can be arranged in alternating clockwise and counterclockwise nested relation.

As shown in FIG. 5, cylindrical inner and outer spacer washers 59 and 61 are preferably placed between adjacent springs in each assembly 52 and 54, along the inner and outer peripheries. For the optional configuration where springs 58 are arranged with kerfs 96 in alternating clockwise and counterclockwise nested relation, the presence of spacer washers 59 and 61 is even more important. For such case, the washers space adjacent springs apart, preventing frictional coaction of the radial arms on adjacent springs as they are displaced perpendicular to the planar faces of the springs. Frictional coaction is more likely to occur with the alternating clockwise/counterclockwise orientation of kerfs 96. For relatively small displacements and nonalternating orientations, washers 59 and 61 can be eliminated to reduce cost and complexity. Washers 59 and 61 are formed from thin pieces of sheet metal, and have been omitted from FIGS. 1, 3, 6 and 7 to simplify the drawings. Alternatively, spacer washers 59 and 61 can be eliminated.

FIG. 5 illustrates passive balance system 10 in an exploded and enlarged perspective view to better facilitate viewing. More particularly, passive balance system 10 is securely mounted to an outer surface of housing member 48 with a single threaded fastener 60. Fastener 60 has a threaded end portion that is received into a complementary threaded bore 62 of mounting post 56. Fastener 60 also has an enlarged head, a smooth shaft portion, and a transition between the smooth shaft portion and the threaded portion that forms a support surface for flexure assemblies 52 and 54. Fastener 60 is sized to receive flexure assemblies 52 and 54 in rigid, clamped engagement between fastener 60 and mounting post 56, when assembled together. A central aperture 64 in each flexure 58 receives fastener 60. Additionally, a cylindrical spacer 66 retains assemblies 52 and 54 in spaced apart, but clamped relation when fastener 60 is threaded into bore 62. Additionally, a washer is seated between fastener 60 and assembly 52 to clamp assembly 52 between washer 68 and spacer 66, and prevent damage to assembly 52 while threading and unthreading fastener 60. Preferably, washer 68, spacer 66, and fastener 60 are sized to fixedly secure and clamp the radial inner periphery of flexures 58 in assemblies 52 and 54 between fastener 60 and post 56.

Preferably, housing member 48 forms an end cap of power module 14, having a thickened, or enforced, portion along the very end to provide adequate structural support for balance system 10 in the region of mounting post 56. Therefore, housing member 48 is a slightly modified version of the end cap disclosed in the power generator of Applicant's co-pending application U.S. Pat. No. 5,743,091 as referenced above. Housing member 48 can be formed in several ways. For example, member 48 can be formed by stamping a piece of sheet metal. Alternatively, member 48 can be formed by machining a piece of metal. Even further, member 48 can be formed by turning, or roll forming a piece of metal over a mandrel. Depending on the construction used, post 56 can be machined directly from member 48, welded to member 48, or attached with fasteners to member 48.

In the above manner, fastener 60 securely affixes the radial innermost portion of each flexure 58 to the rigid, and immovable, body of housing member 48. Preferably, the axis of fastener 60, which is perpendicular to flexures 58, is oriented collinear with the axis of an unwanted reciprocating vibration produced by operating generator 12. In this manner, balance system 10 can be oriented such that the circular face of each flexure 58 is positioned substantially perpendicular to a direction of an unwanted imbalance, or vibration of a machine. The counterbalance mass moves on flexures 58 in a manner that counteracts, or counterbalances, the undesired vibration produced by operation of the machine.

Further according to FIG. 5, the number of flexures in assemblies 52 and 54 can be easily changed by changing the size of spacers 66 and 78, enabling insertion or removal of additional flexures 58 from each assembly 52 and 54, respectively. Alternatively, fasteners 60 and 70 can be resized to accommodate an increased number of springs 58. However, where space for balance system 10 is limited, resizing of spacers 66 and 78 is favorable. If a larger spring constant is needed for a particular vibration mode being produced by a machine, the spring constant can be increased or decreased by increasing or decreasing the number of flexures, respectively. Furthermore, the mass of counterbalance mass 50 can be easily changed by mounting a different counterbalance mass onto system 10. Hence, the spring constant and the quantity of the counterbalance mass can be easily changed to tune balance system 10 for counterbalancing a specific imbalance of a machine in operation. Such tuning is desirable when balance system 10 must be tuned to a desired machine operating frequency having a particular vibration mode.

Counterbalance mass 50 is affixed adjacent the radial outer periphery of flexures, or springs 58, on flexure assemblies 52 and 54. More particularly, a plurality of circumferentially spaced apart threaded fasteners 70 are used to secure counterbalance mass 50 adjacent a radial outer periphery of assemblies 52 and 54. Each fastener 70 is passed through a receiving hole 72 in the ring-shaped body of counterbalance mass 50, an aperture 74 in each spring of assemblies 52 and 54, an aperture 76 of a spacer ring 78, and a threaded aperture 80 of a retaining ring 82. An end portion of fastener 70 has threads which are received in complementary engagement with the threaded bore (or aperture) 80 of retaining ring 82. Spacer 78 is sized in proportion to the stack of springs 58 of assemblies 52 and 54 and the thickness of counterbalance mass 50, allowing the parts to securely fasten together. Fastener 70 traps together mass 50, flexure assembly 52, spacer 78, flexure assembly 54, and retaining ring 82 in rigidly secured engagement when fastener 70 is assembled into securely threaded engagement with bore 80. In this manner, the outer peripheral edge of flexure assemblies 52 and 54 are securely retained together, and counterbalance mass 50 is rigidly and securely retained proximate to the outer periphery of assemblies 52 and 54.

As was the case with spacer 66, spacer 78 can be easily resized to enable insertion and removal of additional springs from assemblies 52 and 54. Similarly, fastener 70 can be resized to enable mounting of a larger or a smaller counterbalance mass 50 along the outer peripheral edges of assemblies 52 and 54. Alternatively, spacer 78 can be formed from a plurality of separate spacers that surround and mount around each fastener, cooperating to form a circumferentially extending spacer array equivalent to spacer 78.

According to the construction of FIG. 5, mass 50 forms only part of the total counterbalance mass of balance system 10. Additionally, the mass of fasteners 70, spacer 78, retaining ring 82 and the radial outer portions of springs 58 and assemblies 52 and 54 also contribute significantly to the total counterbalance mass that is moved in reciprocating motion collinear with the axis of fastener 60. More particularly, the portions of spring 58 that lie radially outwardly of the inner diameter contribute a significant portion of the total mass of the vibration damper of system 10. The rectilinear vibration of the machine along the moving axis of system 10 drives the total counterbalance mass in motion. By tuning the total mass and the total spring constant contributed by springs 58, a passive counterbalance system is produced to substantially offset the machine imbalance at a designated operation speed.

One important improvement provided by the construction of system 10 is the use of springs 58 in a manner that sets the radial outer portion of each spring in reciprocating motion. In contrast, if the radial inner portion of springs 58 were used to support a moving counterbalance mass, and the radial outer portion of springs 58 were retained to housing member 48, only a nominal portion of the mass of springs 58 would contribute to the total effective counterbalance mass of system 10. By reversing the fixed and moving portions, a far greater portion of the mass of springs contributes to the total counterbalance mass, allowing a reduction in the size of mass 50. Therefore, the overall mass of system 10 is decreased for a given system mass and spring constant. Therefore, configuration of counterbalance mass 50 for retention along the radial outer portions of springs 58 significantly improves overall performance, while allowing for minimization of the total mass of system 10, and while still realizing a particular required total effective counterbalance mass. The mass contribution contributed by the radial outer portion of springs 58 hence allows for reduction in mass of system 10, while still realizing an equivalent effective counterbalance mass for a given set of springs 58. Therefore, such a system can be used for applications where it is desirable to minimize the total system mass, yet still realize a desired counterbalance mass.

FIG. 6 illustrates an alternatively constructed passive balance system 110 that is essentially identical to system 10 of FIGS. 1–5. However, system 110 is mounted on mounting post 56, inside housing member 148, and the mass-spring combination is tuned for a different operating frequency of the generator. Namely, a larger number of springs 58 are provided than was the case for the device of FIGS. 1–5. Accordingly, system 110 is retained within the inside chamber of a power module, in direct communication with the working gas contained therein. By placing system 110 inside housing member 148, the moving components of system 110 are protected from contact and damage during use with external devices and objects. For purposes of changing the vibration characteristics, passive balance system 110 is shown with a relatively smaller sized counterbalance mass 150 retained along an outer periphery of a single flexure assembly 152. Mass 150 is retained with a plurality of circumferentially spaced apart threaded fasteners 70 that are threadingly retained in bores 80 of retaining ring 82. Mass 150 can be reduced in this case for two reasons. First, the total mass is modified to realize a balance system having different dynamic properties suitable for a machine having different operating characteristics than the one depicted in FIGS. 1–5. Secondly, a single and larger stack of springs 58 is used in a single flexure assembly 152, and the greater number of springs contribute a significantly increased amount of mass to the total counterbalance mass. Additionally, the greater number of springs 58 provide an increased spring constant as a result of the mass contribution provided by the increased amount of radial outermost portions of springs 58 being driven in motion. Hence, springs 58 contribute a significantly increased portion of the total effective counterbalance mass, allowing for a decreasing in size of counterbalance mass 150 for a desired total effective counterbalance mass. Fastener 60 is used in conjunction with washer 68 to retain the radial innermost portion of springs 58, by receiving fastener 60 through apertures 64. However, it is not necessary that mass 150 be reduced. The size of mass 150 depends on the dynamics of the machine being balanced, the total mass needed (including the mass contributed by the radial outer portions of springs 58), and the overall spring constant produced by springs 58.

FIG. 7 illustrates yet another alternatively constructed passive balance system 210 for use in removing a rectilinear component of vibration from a vibrating machine. Balance system 210 is similar to balance system 10 (of FIGS. 1-5) with a mounting post 56 fixedly retaining an inner diameter of springs 58 to a housing member 248. According to the construction of balance system 210, a single flexure assembly 252 formed from flexures, or springs 58, has a counterbalance mass 250 carried on assembly 252. The flexures 58 of assembly 252 have a large radial stiffness, causing springs 58 to behave as a bearing that guides mass 250 to oscillate in a single axial direction. Additionally, a pair of coil compression springs 90 and 114 add to the spring constant of springs 58, allowing the use of fewer springs 58 to realize a desired spring constant. Optionally, a single spring 90 can be used. Ring-shaped counterbalance mass 250 has a plurality of throughbores 272, each receiving a threaded fastener 70 therethrough. Springs 58 each have corresponding circumferentially spaced apart apertures 74, and retaining ring 282 has corresponding circumferentially spaced apart threaded bores 80 into which each threaded fastener 70 is securely retained. In assembly, mass 250 and the outer periphery of springs 58 are securely retained together between fastener 70 and retaining ring 282.

Furthermore, retaining ring 282 has a circumferential recess 92 extending along an inner face. Recess 92 is sized and configured to receive a circumferential end portion of spring 90, seating spring 90 in compression within recess 92, and against the back face of retaining ring 282. Furthermore, a similar circumferential recess 94 is formed along an outer face of housing member 248. Likewise, mass 250 has a circumferential recess 116 sized to receive one end of conical spring 114. A retaining plate 112 having a retaining flange receives the opposite end of spring 114. Plate 112 is carried rigidly between a head of fastener 161 and cylindrical spacer 110.

Coil springs 90 and 114 are used in balance system 210 to supplement the spring constant of springs 58 in flexure assembly 252. Flat spiral springs 58 are moderately expensive to produce. The fewer number of springs 58 that are required to realized a necessary spring constant, the less it costs to produce balance system 210. Therefore, the advantage of this embodiment is provided by using low cost compression springs in combination with higher cost flexural springs 58 to reduce the cost of system 210. However, fewer springs 58 contribute less mass (from the radial outer portions of the springs), requiring use of a large size counterbalance mass 250 than would otherwise be necessary. Furthermore, one of the benefits of using flat spiral springs 58 is the ability to produce a highly accurate linear reciprocating motion between the radial inner and outer peripheries. Therefore, springs 58 of system 210 provide an accurate guided reciprocating motion of balance mass 250, while springs 58 in combination with coil spring 90 produce the desired spring constant for a given size total effective counterbalance mass. Therefore, a desired spring constant can be realized through a combination of springs 58 and coil springs 90 and 114, while minimizing the total number of springs 58 which must be used, and while still retaining the desired accurate axial reciprocating motion via rectilinear guidance of springs 58.

Preferably, springs 90 and 114 have the same spring constant. According to the construction of FIG. 7, spring 114 is formed from a conical coil. Alternatively, spring 114 can be formed from a cylindrical coil, identical to spring 90. When springs 90 and 114 preferably have the same spring constants, springs 56 remain unstressed in a planar configuration when at rest. Optionally, use of springs with uneven spring constants or characteristics, or use of a single spring will bias or preload springs 56 when in the resting state.

FIG. 8 illustrates one exemplary spring 58 suitable for use with the passive balance system of this invention. Flat spiral spring 58 has a plurality of corresponding kerfs 96. Spiral cut kerfs 96 extend between outer diameter 98 and inner diameter 100, adjacent to central mounting hole 102. Additionally, a turn out of kerf ends 104 and 106 functions to avoid a stress riser therealong. When clamped together, along the outer adjacent region defined by outer diameter 98, a plurality of mounting holes 108 retain spring 58 within a machine, during use. Alternatively, many different forms of kerfs can be used to shape spring 58 including radial cuts as well as other serpentine shapes.

FIG. 8 is a plan view of an improved planar flexure, or flat spiral spring 58. As illustrated, flexure 58 consists of a circular disk of flat sheet metal with attachment holes 108 distributed near its outer periphery. Clamping of individual flexures 58 within a stack is achieved by mounting bolts (not shown) which pass through holes 108 in associated rigid annular clamping rings to secure the flexure between the inner clamping diameter 100 and the outside edge or periphery of a flexure. Additionally, thin washer shaped spacers (not shown) can be deployed between adjacent flexures of the stack, one filling the gap between the outer clamping diameter 98 and the flexure outer diameter edge and the other filling the gap between the inner clamping diameter 100 and the hole 102. Alignment holes are provided in the spacers for receiving the mounting bolts.

As used herein, the terms "flexure" and "flat spiral spring" are used interchangeably to describe springs formed from a flat sheet of metal having kerfs cut through it. Preferably, the kerfs are spiral shaped. A flexure can comprise a single flat spiral spring or a stacked plurality of closely adjacent springs separated by spacer washers that are clamped between the moving members and work in unison. The preferred flexure material for most applications is Sandvik 7C27Mo2 valve Steel (Stainless), available through Sandvik Steel Company, Strip Products Division, Benton Harbor, Mich. The high strength and fatigue resistent nature of this material contribute to reducing the size and weight of the flexure assembly, in comparison with most other readily available candidate materials.

According to this construction, flexure 58 is clamped at its center between a central mounting hole 102 and clamping diameter 100. If spacers are used in the inner regions between hole 102 and clamping diameter 100, they will extend between adjacent springs 58 in the region between hole 102 and clamping diameter 100. In this case, spacers will also be required in the outer regions between the outermost diameter and the clamping diameter 98 having an outside diameter equivalent to the outermost diameter of spring 58 and an inside diameter equivalent to the clamping diameter 98.

Spiral cut kerfs 96 extending between outer diameter 98 and inner diameter 100 form the arm(s) of the flexure 58. Three arms are illustrated in FIG. 8, but versions with one, two and three arms have been successfully implemented in practice. Selecting the best shape for the flexure arms is a compromise between conflicting objectives. The arms do not necessarily have to form a spiral. Objectives are a high axial displacement capability, high surging natural frequency, and a high radial stiffness, while maintaining stresses well below the endurance limit to provide essentially infinite flex life. The arm design can be optimized using a finite element analysis (FEA) code to maintain stresses as nearly uniform as possible throughout the arm(s) during extension. The desired axial stiffness and radial stiffness can be obtained by selecting the thickness of the individual flexures and the total number of flexures in a flexure assembly stack to achieve the desired set of characteristics. Material selection is also a very important parameter which can significantly impact the functionality of the design.

According to an alternative construction, apertures can be cut along the radial outer regions of kerfs 96. With this construction, a plurality of apertures are formed within the spring for purposes of reducing the flexure mass and providing access holes through the flexure for air passage or routing of wires. One such construction was detailed in our U.S. patent application Ser. No. 08/705,432 filed on Aug. 29, 1996, and entitled "Improved Flexure Bearing Support Assemblies, With Particular Application to Stirling Machines", listing inventors as Laurence B. Penswick, Donald C. Lewis, Ronald W. Olan, Brad Ross, Leon Montgomery and Raymond M. Erbeznik. According to such construction, the springs are cut along the radial outer edge of each kerf 96, opening up the kerf to form an aperture therealong. However, this construction will reduce the benefits of this invention by reducing the moving mass contribution of springs 58 on such a balance system.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A passive balance system for counterbalancing vibrations of a machine, comprising:
   a support member adapted to be fixedly carried by the machine; and
   a flexure assembly in the form of at least one flat spring including connections along a central portion, the central portion being fixedly mounted to the support member, an outer peripheral portion of the flat spring supported for movement relative to the central portion so as to provide at least in part a movable vibration dampening mass;
   the movable vibration dampening mass of the flexure assembly presented for movement in substantial alignment with a desired rectilinear component of vibration of the machine to counterbalance vibrations emanating therefrom.

2. The passive balance system of claim 1 wherein the flexure assembly further includes connections radially spaced from the central portion connections along the outer peripheral portion, and the balance system further comprises a counterbalance mass fixedly carried by the flexure assembly along the outer peripheral portion, the counterbalance mass and the outer peripheral portion of the flat spring providing at least in part the movable vibration dampening mass of the system.

3. The passive balance system of claim 2 wherein the counterbalance mass is formed from a cylindrical body of dense material.

4. The passive balance system of claim 2 further comprising at least one coil spring provided in compressed engagement with the flat spring, the flat spring and the coil spring cooperating to provide a system spring constant of the passive balance system.

5. The passive balance system of claim 1 wherein the support member comprises a mounting post and a housing member configured to carry the mounting post, a radial inner periphery of the flat spring being fixedly carried by the mounting post on the housing member.

6. The passive balance system of claim 1 wherein the flat spring comprises a flat spiral spring.

7. The passive balance system of claim 6 wherein the flat spiral spring comprises a plurality of kerfs extending substantially radially of the spring, the kerfs at least in part cooperating to define a plurality of spring arms.

8. The passive balance system of claim 1 wherein the flexure assembly is carried inside the machine.

9. The passive balance system of claim 1 wherein the flexure assembly is carried externally of the machine.

10. The passive balance system of claim 1 wherein the flat spring is fixedly mounted at its center to the support member.

11. The passive balance system of claim 1 further comprising connections along an outer peripheral portion of the flat spring radially spaced from the connections along the central portion, the radially spaced connections accommodating relative axial movement between the outer peripheral portion and the central portion while maintaining the outer peripheral portion and the central portion in coaxial alignment to assure rectilinear motion of the movable vibration dampening mass.

12. A passive balance system for counterbalancing vibrations of a machine having reciprocating components that cause vibration, comprising:
    a support member adapted to be fixedly carried by the machine;
    a flexure assembly in the form of at least one flat spring including radially spaced connections along a central portion and an outer peripheral portion, respectively, the central portion being fixedly mounted to the support member; and
    a counterbalance mass fixedly carried by the flexure assembly along the outer peripheral portion;
    the flexure assembly supporting the counterbalance mass for movement in substantial alignment with a desired rectilinear component of vibration of the machine to counterbalance vibrations emanating therefrom.

13. The passive balance system of claim 12 wherein the flat spring comprises a flat spiral spring.

14. The passive balance system of claim 13 wherein the flat spiral spring comprises a plurality of kerfs extending substantially radially of the spring, the kerfs at least in part cooperating to define a plurality of spring arms.

15. The passive balance system of claim 12 wherein the support member comprises a mounting post and a housing member configured to carry the mounting post, a radial inner periphery of the flat spring being fixedly carried by the mounting post on the housing member.

16. The passive balance system of claim 12 further comprising at least one coil spring provided in compressed engagement with the flat spring, the flat spring and the coil spring cooperating to provide a system spring constant of the passive balance system.

17. The passive balance system of claim 12 wherein the flexure assembly is carried inside the machine.

18. The passive balance system of claim 12 wherein the flexure assembly is carried externally of the machine.

19. The passive balance system of claim 12 wherein the flat spring is fixedly mounted at its center to the support member.

20. A vibration counterbalanced machine, comprising:

a housing member supporting a working member in substantially periodic and oscillating relation within the machine;

a support member fixedly carried by the housing member of the machine; and a flexure assembly in the form of at least one flat spring including connections along a central portion, the central portion being fixedly mounted to the support member, an outer peripheral portion of the flat spring providing at least in part a movable vibration dampening mass;

the flexure assembly presenting the vibration dampening mass for movement in substantial alignment with a desired rectilinear component of vibration of the machine to counterbalance vibrations emanating therefrom.

21. The machine of claim 20 wherein the flexure assembly further includes connections radially spaced from the central portion connections along the outer peripheral portion, and the balance system further comprises a dedicated counterbalance mass fixedly carried by the flexure assembly along the outer periphery, the dedicated counterbalance mass and the outer peripheral portion of the flat spring providing at least in part the movable vibration dampening mass of the balance system.

22. The passive balance system of claim 20 wherein the flat spring comprises a flat spiral spring.

23. The passive balance system of claim 22 wherein the flat spiral spring comprises a plurality of kerfs extending substantially radially of the spring, the kerfs at least in part cooperating to define a plurality of spring arms.

24. The passive balance system of claim 20 further comprising at least one coil spring provided in compressed engagement with the flat spring, the flat spring and the coil spring cooperating to provide a system spring constant of the passive balance system.

* * * * *

UNITED STATES PATENT AND TRADEMARK OFFICE
CERTIFICATE OF CORRECTION

PATENT NO. : 5,895,033
DATED : April 20, 1999
INVENTOR(S) : Brad Ross and Ronald W. Olan It is certified that error appears in the above-identified patent and that said Letters Patent is hereby corrected as shown below:

Col. 9, lines 48-49: Delete "that are required to realized", and insert --that is required to realize--.

Col. 10, line 8: Delete "springs 56 remain", and insert --springs 58 remain--.

Col. 10, line 11: Delete "springs 56 when", and insert --springs 58 when--.

Signed and Sealed this

Fourteenth Day of September, 1999

Attest:

Q. TODD DICKINSON

*Attesting Officer*    *Acting Commissioner of Patents and Trademarks*